US009852347B2

(12) United States Patent
Lee (10) Patent No.: US 9,852,347 B2
(45) Date of Patent: Dec. 26, 2017

(54) PARKING GUIDE SYSTEM WHICH DISPLAYS PARKING GUIDE LINE ON IMAGE CORRECTED USING HOMOGRAPHY AND METHOD FOR CONTROLLING THE SAME

(71) Applicant: HYUNDAI MOBIS Co., Ltd., Yongin-si, Gyeonggi-do (KR)

(72) Inventor: Seong Soo Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 94 days.

(21) Appl. No.: 14/993,717

(22) Filed: Jan. 12, 2016

(65) Prior Publication Data

US 2016/0217558 A1  Jul. 28, 2016

(30) Foreign Application Priority Data

Jan. 22, 2015  (KR) .......................... 10-2015-0010776

(51) Int. Cl.
  *G06K 9/00* (2006.01)
  *G06T 7/80* (2017.01)
(52) U.S. Cl.
  CPC ..... *G06K 9/00812* (2013.01); *G06K 9/00805* (2013.01); *G06T 7/80* (2017.01); *G06T 2207/30264* (2013.01)
(58) Field of Classification Search
  None
  See application file for complete search history.

(56) References Cited

U.S. PATENT DOCUMENTS

| 7,742,062 B2* | 6/2010 | Oisel ...................... G06K 9/209 345/619 |
| 8,260,001 B2* | 9/2012 | Jung ...................... G01S 7/4802 340/932.2 |
| 2006/0268009 A1* | 11/2006 | Oisel ...................... G06K 9/209 345/629 |
| 2009/0010507 A1* | 1/2009 | Geng ...................... G06T 7/593 382/128 |

(Continued)

FOREIGN PATENT DOCUMENTS

KR  10-2013-0054640 A  5/2013

*Primary Examiner* — Tahmina Ansari
(74) *Attorney, Agent, or Firm* — Paratus Law Group, PLLC (57) ABSTRACT

A parking guide system, including: a memory which stores camera parameter information and design reference information; a travelling detecting unit which measures travelling information; an image receiving unit which sequentially receives a first image taken before travelling and a second image taken after the travelling from a camera; a characteristic point extracting unit which extracts and matches characteristic points commonly included in the first and images; a homography calculating unit configured to calculate a first homography based on the camera parameter information, the design reference information, and the travelling information, and calculate a second homography that is a homography between the first image and the second image based on coordinates of the characteristic point; and an error calculating unit which calculates a third homography that is a homography for correcting an image according to a result of a comparison of the first homography and the second homography.

13 Claims, 7 Drawing Sheets

(56) References Cited

U.S. PATENT DOCUMENTS

| | | | |
|---|---|---|---|
| 2009/0207045 A1* | 8/2009 | Jung | G06T 7/74 340/932.2 |
| 2010/0158321 A1* | 6/2010 | Shah | G06T 7/194 382/107 |
| 2010/0283633 A1* | 11/2010 | Becker | B60R 1/00 340/932.2 |
| 2016/0217558 A1* | 7/2016 | Lee | G06T 7/80 |

* cited by examiner

PARKING GUIDE SYSTEM WHICH DISPLAYS PARKING GUIDE LINE ON IMAGE CORRECTED USING HOMOGRAPHY AND METHOD FOR CONTROLLING THE SAME

CROSS-REFERENCE TO RELATED APPLICATIONS

The present application claims priority to Korean Patent Application Number 10-2015-0010776 filed Jan. 22, 2015, the entire contents of which application is incorporated herein for all purposes by this reference.

TECHNICAL FIELD

The present invention relates to a parking guide system and a method for controlling the same, and more particularly, to a parking guide system, which overlaps a parking guide line on an image input through a camera mounted at a rear side of a vehicle and displays the image, and a method for controlling the same.

BACKGROUND

In general, most drivers operate a vehicle by directly checking a surrounding area of the vehicle visually, or checking an obstacle present at a side or a rear side of the vehicle through a side mirror and the like.

However, depending on the kind of vehicle, a vehicle size, and a surrounding situation around a vehicle, there inevitably exists a blind spot in which a driver cannot secure an appropriate view through visual check, a side mirror, or the like.

Particularly, a large vehicle has an area which cannot be recognized only with a side mirror, so that in order to prevent an accident causing personnel and material loss, a driver needs to inconveniently directly check whether an obstacle is present with naked eyes while looking around a surrounding area of the vehicle before getting in the vehicle.

As a technology for solving the inconvenience, a parking guide system, which helps a driver to recognize a rear side situation (for example, a position of a parking line and existence of an obstacle) of a vehicle and safely park the vehicle according to a parking guide line by displaying a parking guide line on an image input through a camera mounted at a rear side of a vehicle, has been recently developed. However, a mounting state (for example, a mounting height, a mounting point, and a mounting posture) of a camera utilized in a parking guide system in the related art may have errors compared to a design reference by several situations (for example, incorrect assembling in a process line and external impact).

When the mounting state of the camera is changed, a rear image of the vehicle provided to the user inevitably includes information which is very different from actual information, and thus, a parking direction indicated by the parking guide line which overlaps the rear image and is displayed is also mismatched to an actual reverse direction of the vehicle. Accordingly, when a user reverses the vehicle according to a direction of the parking guide line, it is difficult to accurately park the vehicle and material and personnel loss may be generated.

Related Art Literature

Patent Document

Korean Patent Application Laid-Open No. 10-2013-0054640: Improved Parking Guide Device and Method Thereof (May 27, 2013)

SUMMARY

The present invention has been made in an effort to provide a parking guide system, which decreases mismatch between an actual vehicle reverse direction and a direction indicated by a parking guide line due to an error of a mounting state of a camera provided in a vehicle, and a method for controlling the same.

Objects of the present invention are not limited to the objects described above, and other objects that are not described will be clearly understood by a person skilled in the art from the description below.

An exemplary embodiment of the present invention provides a parking guide system, including: a memory, in which camera parameter information and design reference information are stored; a travelling detecting unit configured to measure travelling information containing a travelling distance and a travelling direction according to travelling when a vehicle travels; an image receiving unit configured to sequentially receive a first image that is an image before the travelling and a second image that is an image after the travelling from a camera; a characteristic point extracting unit configured to extract and match characteristic points commonly included in the first image and the second image; a homography calculating unit configured to calculate a first homography based on the camera parameter information, the design reference information, and the travelling information, and calculate a second homography that is a homography between the first image and the second image based on coordinates of the characteristic point; and an error calculating unit configured to calculate a third homography that is a homography for correcting an image according to a result of a comparison of the first homography and the second homography.

Another exemplary embodiment of the present invention provides a method for controlling a parking guide system, including: receiving a first image before travelling of a vehicle from a camera; determining whether an obstacle is detected at a rear side of the vehicle; measuring a travelling distance and a travelling direction of the vehicle when it is determined that the obstacle is not detected; receiving a second image after the travelling of the vehicle from the camera; extracting and matching characteristic points commonly included in the first image and the second image; calculating a first homography based on camera parameter information and travelling information of the vehicle; calculating a second homography by using the characteristic points extracted from the first image and the second image and matched, and the travelling information of the vehicle; comparing the first homography and the second homography and determining whether an error exists between the first and second homographies; and calculating a third homography for correcting an image when the error exists between the first and second homographies.

According to the parking guide system and the method for controlling the same according to the exemplary embodiments of the present invention, it is possible to decrease a mismatch between an actual vehicle reverse direction and a direction indicated by a parking guide line by correcting a rear image according to a change in a mounting state of the camera mounted at a rear side of a vehicle.

The effects of the present invention are not limited to the aforementioned effects, and other effects, which are not mentioned above, will be clearly understood by those skilled in the art from the claims.

DETAILED DESCRIPTION

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are provided for rendering the disclosed contents of the present invention complete and provide a complete understanding of and sufficiently transferring the scope of the invention to a person with ordinary skill in the technical field to which the present invention pertains, and the present invention will only be defined by the scope of the claims. Like reference numerals indicate like elements throughout the specification.

Accordingly, in some exemplary embodiments, well-known process steps, publicly known structures, and publicly known technologies are not described in detail in order to avoid obscuring interpretation of the present invention.

Meanwhile, terms used in the present specification are to explain exemplary embodiments rather than limiting the present invention. Unless particularly stated otherwise in the present specification, a singular form also includes a plural form. The word "comprises" and/or "comprising" used in the present specification will be understood to imply the inclusion of stated constituents, steps, and/or operations but not the exclusion of any other constituents, steps, and/or operations.

The term "and/or" includes each of the mentioned items or all of the combinations including one or more items.

In the present specification, names of constituents, which are in the same relationship, are divided into "the first", "the second", and the like, but the present invention is not necessarily limited to the order in the following description.

Exemplary embodiments described in the present specification will be described with reference to a perspective view, a cross-sectional view, a side view, and/or a schematic view, which are ideal example diagrams of the present invention. Accordingly, a form of the example diagram may be modified by a manufacturing technology and/or an allowable error. Accordingly, the exemplary embodiments of the present invention are not limited to the illustrated specific form, but include a change in a form generated according to a manufacturing process. Further, in each diagram illustrated in the present invention, each constituent element is illustrated to be slightly expanded or reduced considering convenience of a description.

Hereinafter, a parking guide system and a method for controlling the same according to an exemplary embodiment of the present invention will be described in detail with reference to the accompanying drawings.

Figure 1:
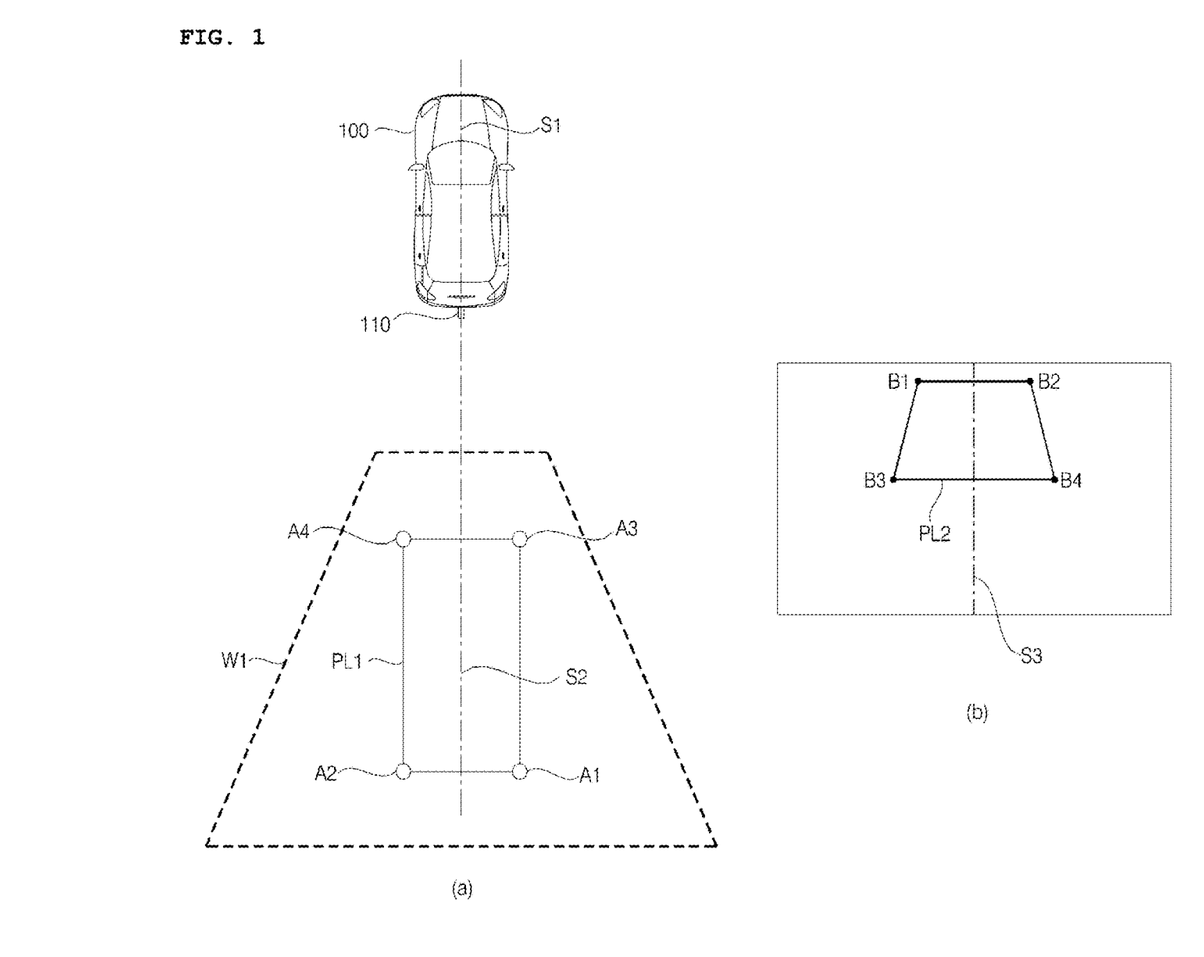
FIG. 1 is a diagram illustrating an example of an image photographed in a state where an actual mounting state of a camera provided in a vehicle is in accordance with a design reference.

FIG. 1 is a diagram illustrating an example of an image photographed in a state where an actual mounting state of a camera 110 provided in a vehicle is in accordance with a design reference.

First, referring to FIG. 1A, the camera 110 may be mounted at a rear side of the vehicle. The camera 110 is mounted to be in accordance with a design reference and photographs a rear image of the vehicle. The design reference may include a reference value for a height, at which the camera 110 needs to be spaced apart from the ground, a point in the vehicle, at which the camera 110 is mounted at the height, and a mounting posture. In this case, the reference value for the posture of the design reference is a value determining a direction of the camera 110, and may mean a posture of the camera 110, in which, when the vehicle is vertically viewed from an upper side, a center axis of the camera 110 is matched with a center axis S1 in a longitudinal direction of the vehicle and the camera 110 is tilted in a down direction toward the ground at a predetermined angle as illustrated in FIG. 1A. The camera 110 mounted according to the design reference may photograph a ground area W1 in a rear direction of the vehicle. In this case, as illustrated in FIG. 1, a parking line PL1 is displayed in the photographed ground area W1, and it is assumed that a center axis S2 in a longitudinal direction of the parking line PL1 is matched with the center axis S1 in the longitudinal direction of the vehicle. The center axis of the camera 110, the center axis S1 in the longitudinal direction of the vehicle, and the center axis S2 in the longitudinal direction of the parking line PL1 are all matched with each other, so that a center axis of the ground area W1 photographed by the camera 110 may also be matched with the three center axes.

The parking line PL may have a rectangular shape having four apexes, that is, first to four apexes A1, A2, A3, and A4, and the camera 110 photographs the ground area W1 in the rear direction of the vehicle, so that an image corresponding to the ground area W1 may be generated as illustrated in FIG. 1B.

Investigating the image in detail, the first to four apexes A1, A2, A3, and A4 of the actual parking line PL1 correspond to first to fourth coordinates B1, B2, B3, and B4 of each image. In this case, a corner between the first and second apexes A1 and A2 is farther from the camera 110 than a corner between the third and fourth apexes A3 and A4, so that the parking line PL2 displayed on the image is converted into a trapezoid shape, in which a distance between the first and second coordinates B1 and B2 is shorter than a distance between the third and fourth coordinates B3 and B4, and displayed. In this case, the center axis S2 in the longitudinal direction of the parking line PL1 is matched with the center axis S1 in the longitudinal direction of the vehicle, so that a vertical center axis of the trapezoidal parking line PL2 displayed on the image may be matched with a vertical center axis S3 of a plane of the image.

According to FIG. 1, when the camera 110 is accurately mounted according to the design reference, an image photographed by the camera 110 may be represented without distortion of an actual rear situation of the vehicle. In the meantime, when the camera 110 is not accurately mounted according to the design reference (that is, an error is generated) unlike FIG. 1, an image containing information different from an actual rear situation may be generated, which will be described in detail with reference to FIG. 2 below.

Figure 2:
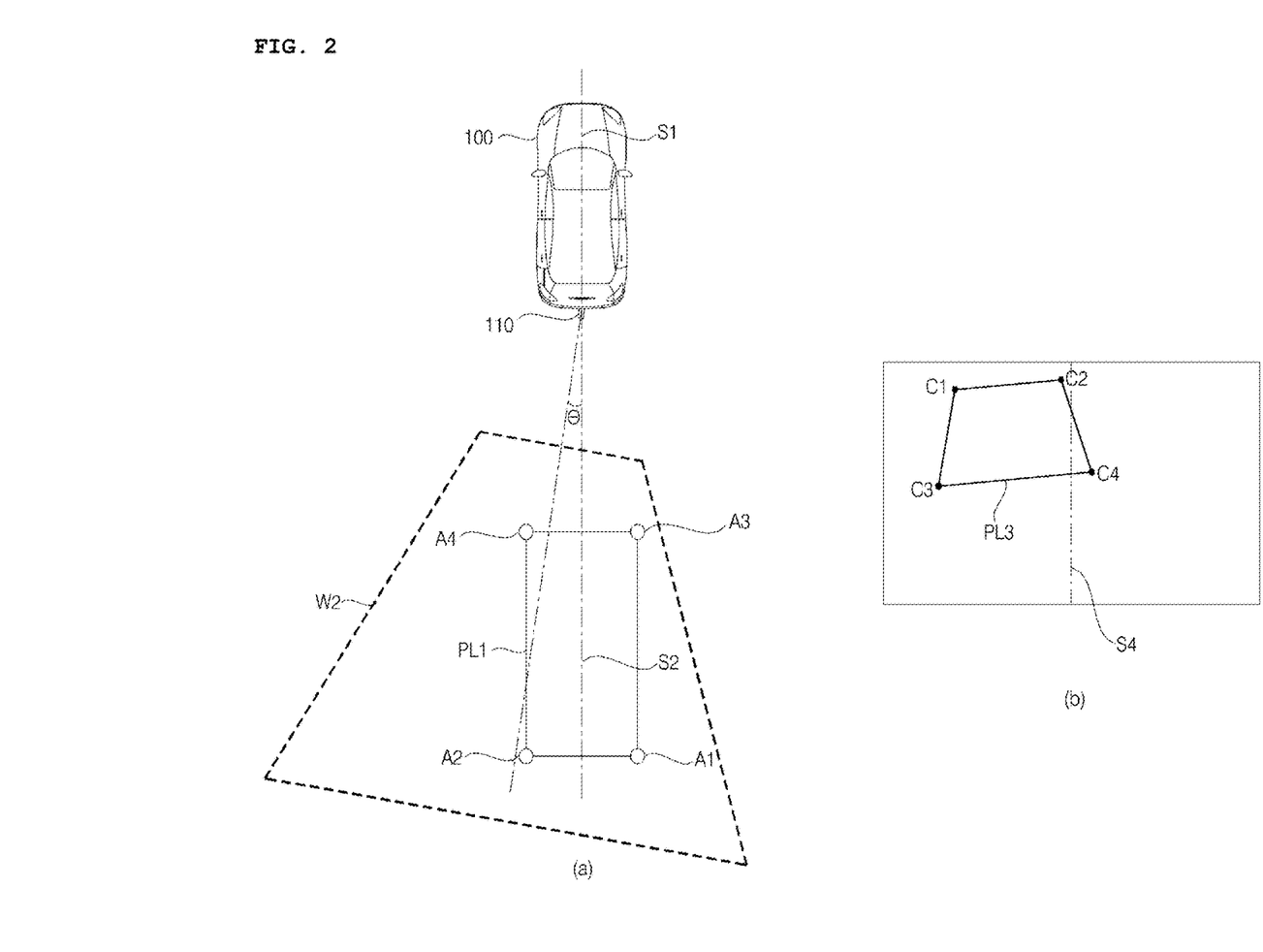
FIG. 2 is a diagram illustrating an example of an image photographed in a state where an actual mounting state of a camera provided in a vehicle is not in accordance with a design reference.

FIG. 2 is a diagram illustrating an example of an image photographed in a state where an actual mounting angle of the camera 110 provided in the vehicle is not in accordance with the design reference.

Referring to FIG. 2A, FIG. 2A is the same as FIG. 1B in that the center axis S2 in the longitudinal direction of the parking line PL1 is matched with the center axis S1 in the longitudinal direction of the vehicle, but is different in that an error is generated between an actual mounting position and the design reference of the camera 110.

Particularly, the camera 110 is mounted in the vehicle in a state where the center axis of the camera 110 deviates from the center axis S1 in the longitudinal direction of the vehicle by a first value θ in a predetermined direction (for example, a right side). Accordingly, the center axis of the camera 110 is also not matched with the center axis S2 of the parking line PL1, and a distortion may be generated in a visual field of the rear side of the vehicle photographed by the camera 110 by an error existing in a mounting posture of the camera 110. That is, the camera 110 generates an image for a ground area W2 different from the ground area W1 illustrated in FIG. 1A.

Referring to FIG. 2B, a parking line PL3 displayed on an image is not a trapezoid unlike the illustration of FIG. 1B, and may be shown as deviating to the left side based on a vertical center axis S4 of a plane of the image. More particularly, the four apexes, the first to fourth apexes A1, A2, A3, and A4, of the actual parking line PL1 correspond to first to fourth coordinates C1, C2, C3, and C4 of the image, respectively, and the first to fourth coordinates C1, C2, C3, and C4 are not matched with four coordinates B1, B2, B3, and B4 illustrated in FIG. 1B.

Figure 3:
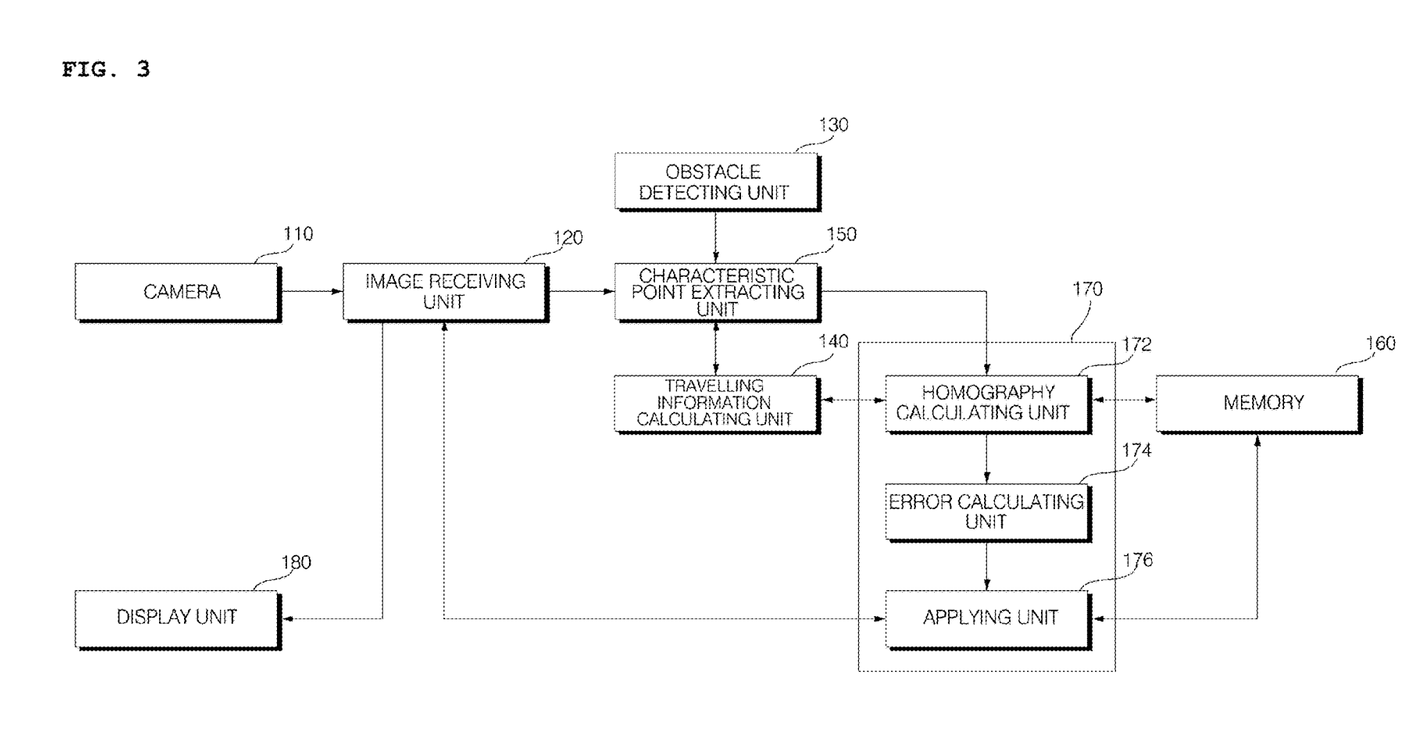
FIG. 3 is a block diagram schematically illustrating a configuration of a parking guide system according to an exemplary embodiment of the present invention.

That is, even though a position of the vehicle and the rear situation of the vehicle (for example, the position of the parking line) are not changed at all, different images for the same rear situation may be displayed according to whether an error is generated in the mounting position of the camera 110 mounted in the vehicle or the direction of the camera 110. FIG. 3 is a block diagram schematically illustrating a configuration of a parking guide system 100 according to an exemplary embodiment of the present invention.

Referring to FIG. 3, the parking guide system 100 according to the exemplary embodiment of the present invention may include the camera 110, an image receiving unit 120, an obstacle detecting unit 130, a memory 160, a travelling information calculating unit 140, a characteristic point extracting unit 150, a control unit 170, and a display unit 180. In this case, the control unit 170 may include a nomography calculating unit 172, an error calculating unit 140, and an applying unit 176.

The camera 110 is mounted at the rear side of the vehicle, and generates a rear image by photographing a physical space existing within a predetermined distance from the rear side of the vehicle. The camera 110 may be mounted at, for example, a part of a rear bumper, or an upper part or a lower part of a license plate. However, the mounting position of the camera 110 is not limited thereto, and when the camera 110 may generate a rear image of the vehicle at a specific mounting position, the mounting position is not particularly limited.

FIG. 3 illustrates that only one camera 110 is mounted in the vehicle, but it is to be appreciated that less or more cameras 110 may be included according to a view angle and the like of the camera 110. The camera 110 may be a super-wide-angle camera 110 having a view angle of 180° or more.

The image receiving unit 120 receives a rear image sequentially input through the camera 110.

The obstacle detecting unit 130 is mounted to be adjacent to the mounting position of the camera 110 to detect an obstacle existing within a predetermined distance from the vehicle. The obstacle detecting unit 130 may also detect a position of the obstacle or a distance to the obstacle, as well as the existence of the obstacle. The obstacle detecting unit 130 may include at least one of an ultrasonic sensor, a laser sensor, and an infrared sensor. However, this is illustrative, and other various sensors capable of detecting an obstacle existing around the vehicle may also be included.

The travelling information calculating unit 140 may calculate a travelling distance and a travelling direction according to the travelling of the vehicle. The travelling information calculating unit 140 may include one or more wheel encoders, and the wheel encoder may calculate a travelling distance and a travelling direction of the vehicle based on the number of rotations for each wheel of the vehicle. However, this is illustrative, and other publicly-known schemes capable of calculating a travelling distance and a travelling direction of the vehicle may be applied as a matter of course.

The characteristic point extracting unit 150 extracts a characteristic point from the image received through the image receiving unit 120. Particularly, the characteristic point extracting unit 150 may extract a characteristic point commonly included in a first image that is an image before the travelling and a second image that is an image after the travelling according to the travelling distance and the travelling direction calculated by the travelling information calculating unit 140. Here, the characteristic point means a point having a unique characteristic distinguishable from another part of the image. The characteristic point extracting unit 150 may extract each of the characteristic point included in the first image and the characteristic point included in the second image, and match the characteristic points extracted from the first image and the second image based on at least one of various algorithms, such as a features from accelerated segment test (FAST) algorithm, a scale invariant feature transform (SIFT) algorithm, a speeded up robust feature (SURF) algorithm, a Harris corner algorithm, a binary robust invariant scalable keypoints (BRISK) algorithm, an oriented fast and rotated brief (ORB) algorithm, and a fast retina keypoint (FREAK) algorithm, performing extraction and matching of the characteristic points.

In this case, the characteristic point extracting unit 150 may extract a characteristic point within an area (that is, an area corresponding to the ground), in which an obstacle is not detected by the obstacle detecting unit 130, in the entire area of the image.

A nomography to be described below is a 3D square matrix and is defined by eight variables, and the characteristic point extracting unit 150 may extract four or more characteristic points commonly included in the first image and the second image. The reason is that one characteristic point has coordinates (for example, (x, y)) for two axes of a plane of the image.

The memory 160 stores camera parameter information and design reference information. The design reference information may contain information on a geometrical relation with an actual space, such as a mounting height of the camera 110 for the ground, a mounting position, and a posture determining a direction of the camera 110 when the camera 110 is mounted in the vehicle, as described above. The design reference information may be related to information on an extrinsic parameter of the camera. Further, the camera parameter information may contain information on an intrinsic parameter of the camera 110. The information on the intrinsic parameter of the camera 110 may contain information on a focal length, a principal point, and a skew coefficient. The memory 160 may be a flash memory type 160, but is not limited thereto, and may include one or more storage media capable of storing data, such as a solid state disk (SSD) type, a random access memory (RAM), a static random access memory (SRAM), a read-only memory (ROM), an electrically erasable programmable read-only memory (EEPROM), and a programmable read-only memory (PROM).

The control unit 170 controls the general operation of the parking guide system 100. The control unit 170 may provide, output, or process information or function appropriate to a user by processing a signal, data, information, and the like input or output through each constituent element or driving an application program stored in the memory 160. The nomography calculating unit 172, the error calculating unit 140, and the applying unit 176 included in the control unit 170 will be described in more detail below.

The homography calculating unit 172 calculates a first homography and a second homography. First, the homography used in the present invention may mean a conversion relation between planes of two images in 2D projective geometry.

First, the homography calculating unit 172 calculates a first homography based on the camera parameter information stored in the memory 160 and the travelling information calculated by the travelling information calculating unit 140.

The first homography means a homography between a randomly designated characteristic point within a virtual image and a characteristic point within another virtual image changed according to the travelling information calculated by the travelling information calculating unit 140 on an assumption that the camera 110 is accurately mounted according to the design reference. In this case, the characteristic points within the two virtual images are matched to each other. Particularly, the camera parameter information contains both the information on the intrinsic parameter of the camera 110 and the information on the extrinsic parameter of the camera 110, so that the homography calculating unit 172 may calculate the first homography that is a conversion relation between the characteristic points within the respective virtual images before and after the travelling corresponding to the travelling distance and the travelling direction calculated by the travelling information calculating unit 140 by applying the travelling information of the vehicle to the intrinsic parameter of the camera 110 and the extrinsic parameter of the camera 110. The first homography is a homography that is a target for comparing with a second homography to be described below.

Next, the homography calculating unit 172 calculates a second homography that is a homography between the characteristic points within the first image and the characteristic points within the second image, which are extracted and matched by the characteristic point extracting unit 150, by using the travelling information calculated by the travelling information calculating unit 140. That is, the second homography is a homography between two images actually photographed by the camera 110 according to the travelling information calculated by the travelling information calculating unit 140 before and after the travelling. The intrinsic parameter of the camera 110 included in the camera parameter information has a fixed value as long as an intentional operation is not applied, and the extrinsic parameter of the camera 110 is changed according to the travelling information calculated by the travelling information calculating unit 140, so that the homography calculating unit 172 may calculate the second homography by using coordinates of the characteristic points within the two images before and after the travelling and the travelling information.

The error calculating unit 140 compares the first homography and the second homography and determines whether the two homographies are matched with each other. Further, when the two homographies are not matched with each other as a result of the comparison, the error calculating unit 140 calculates a third homography that is a homography for correcting an image. In this case, the error calculating unit 140 may calculate the third homography by using Equation 1 below.

$$H3 = H2 - 1 \times H1 \qquad \text{<Equation 1>}$$

Here, H1 means the first homography, H2 means the second homography, and H3 means the third homography. When the third homography is not a unit matrix, it may mean that an error is generated between the actual mounting position of the camera 110 and the design reference.

Next, the applying unit 176 may correct a third image by applying the third homography to an image (hereinafter, referred to as the "third image) received after the second image from the camera 110. Further, the applying unit 176 may simultaneously display the third image before the correction and the third image after the correction through the display unit 180, and output a menu for receiving a selection about whether to correct (that is, whether to apply the third homography to the third image). When the applying unit 176 receives a user input for approving the correction through the menu, the applying unit 176 may correct the third image by applying the third homography to the third image and then display the third image on the display unit 180, and store the third homography in the memory 160.

When a previously stored third homography exists in the memory 160, the third homography may be updated.

The control unit 170 may overlap a parking guide line on the display unit 180, in which the image input through the camera 110 is displayed, and displays the parking guide line. In this case, a steering sensor may be mounted at one side of a steering wheel of the vehicle to detect a steering angle of the vehicle, information on various parking guide lines according to the steering angle of the vehicle may have been previously stored in the memory 160, and the control unit 170 may search for a parking guide line corresponding to the steering angle of the vehicle in the memory 160, and overlap the searched parking guide line on the image displayed on the display unit 180.

The constituent elements illustrated in FIG. 3 are not essential to implement the parking guide system 100 related to the present invention, so that more or less constituent elements than the constituent element listed above may be included depending on an exemplary embodiment.

Figure 4:
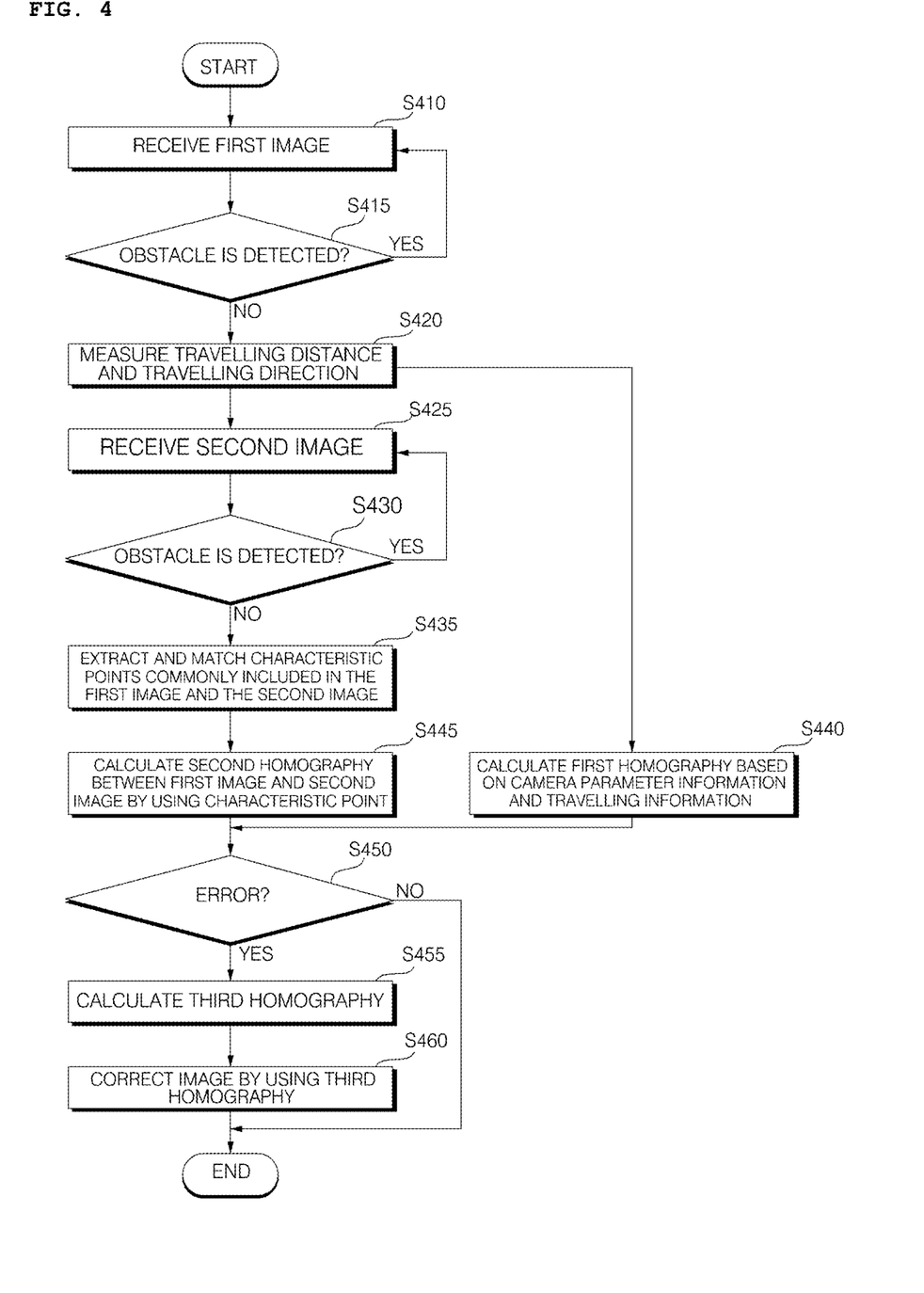
FIG. 4 is a flowchart illustrating a method of controlling a parking guide system according to an exemplary embodiment of the present invention.

FIG. 4 is a flowchart illustrating a method of controlling the parking guide system 100 according to an exemplary embodiment of the present invention.

Referring to FIG. 4, the control unit 170 receives a first image from the camera 110 through the image receiving unit 120 (S410).

Next, the control unit 170 determines whether an obstacle is detected in a rear space of the vehicle corresponding to the first image through the obstacle detecting unit 130 (S415). When the obstacle is detected as a result of the determination, the control unit 170 may repeat the aforementioned process until the obstacle is not detected.

Next, as a result of the determination in operation S420, when the obstacle is not detected, the control unit 170 measures a travelling distance and a travelling direction of the vehicle through the travelling information calculating unit 140 (S420).

Next, the control unit 170 receives a second image from the camera 110 through the image receiving unit 120 after the travelling measured in operation S420 (S425). That is, the first image may be the image just before the travelling measured in operation S420, and the second image may be an image just after the travelling measured in operation S420.

Next, the control unit 170 determines whether an obstacle is detected in a rear space of the vehicle corresponding to the second image through the obstacle detecting unit 130 (S430). When the obstacle is detected as a result of the determination, the control unit 170 may repeat the aforementioned process until the obstacle is not detected.

Next, the control unit 170 extracts and matches characteristic points commonly included in the first image and the second image (S435). Particularly, the control unit 170 matches one to one the characteristic point extracted from the first image and the characteristic point extracted from the second image. In this case the control unit 170 may extract four or more characteristic points for each of the first image and the second image as described above.

Next, the control unit 170 may calculate a second homography by using the characteristic points extracted from the first image and the second image and matched and the travelling information calculated by the travelling information calculating unit 140 (S445). In the meantime, the control unit 170 may perform operation S440 of calculating a first homography based on camera parameter information and travelling information, so that operation S440 may be performed in parallel to operation S445.

Next, the control unit 170 determines whether an error exists between the first homography and the second homography by comparing the first homography and the second homography (S450). The existence of the error between the first homography and the second homography may mean that an error is generated at an actual mounting position of the camera 110.

When the error exists between the two homographies as a result of the determination of operation S450, the control unit 170 may calculate a third homography that is a homography for correcting an image by using Equation 1 below (S455).

$$H3 = H2 - 1 \times H1 \qquad \text{<Equation 1>}$$

Here, H1 means the first homography, H2 means the second homography, and H3 means the third homography.

Next, the control unit 170 may correct the image displayed on the display unit 180 by applying the third homography to the second image or a third image which is input after the second image (S460). In this case, the control unit 170 may simultaneously display an image before the correction through the third homography and an image after the correction through the third homography on the display unit 180. Further, the control unit 170 may output a menu for receiving a selection about whether to correct the image on the display unit 180, and when a user input approving the correction is received, the control unit 170 may set the image after the correction as a basic image displayed on the display unit 180.

In the meantime, the control unit 170 may perform the aforementioned method for controlling the parking guide system 100 when the vehicle enters a reverse mode R.

Hereinafter, an operation of correcting the image input through the camera 110, in which an error exists compared to the design reference, will be described in detail. For convenience of the description, it is assumed in FIGS. 5 and 6 that the vehicle illustrated in FIGS. 1 and 2 reversely moves by a first distance d along the longitudinal vertical axis S1.

Figure 5:
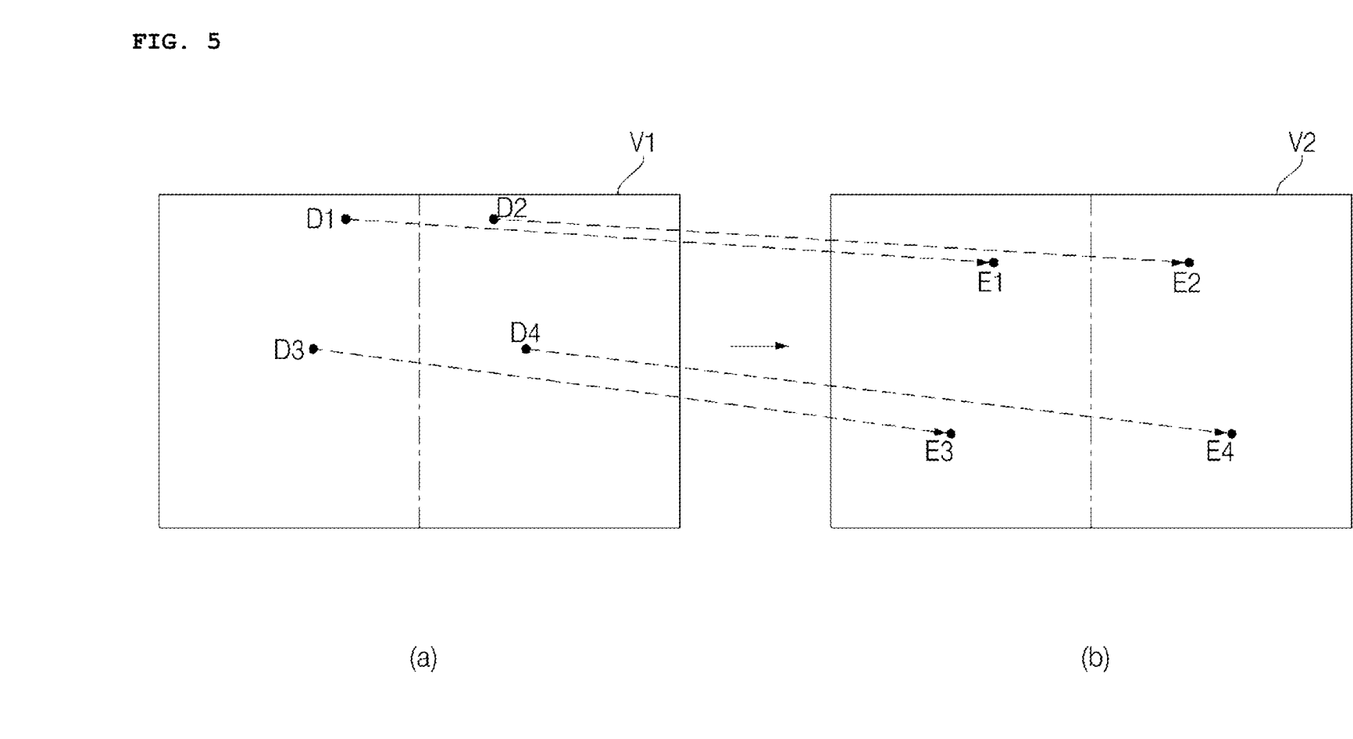
FIG. 5 is a diagram illustrating an example for describing an operation of calculating a first homography according to camera parameter information, design reference information, and vehicle travelling information by the parking guide system according to the exemplary embodiment of the present invention.

FIG. 5 is a diagram illustrating an example for describing an operation of calculating a first nomography according to camera parameter information, design reference information, and vehicle travelling information by the parking guide system 100 according to the exemplary embodiment of the present invention.

Referring to FIG. 5A, when the control unit 170 calculates travelling information of the vehicle through the travelling information calculating unit 140, the control unit 170 generates a first virtual image R1 in which at least four predetermined characteristic points D1, D2, D3, and D4 are randomly designated. That is, the first virtual image R1 is an image generated by the control unit 170 by virtually setting a view point, at which the camera 110 takes a photograph, based on an assumption that the mounting position and the direction of the camera 110 are in accordance with the design reference before the travelling of the vehicle.

Referring to FIG. 5B, the control unit 170 may generate a second virtual image V2 for a view point, into which the view point corresponding to the first virtual image V1 is converted by a degree corresponding to the travelling information, by using the camera parameter information, the design reference information, and the travelling information. Further, the control unit 170 may calculate coordinates for characteristic points E1, E2, E3, and E4 of the second virtual image V2 matched to the characteristic points D1, D2, D3, and D4 of the first virtual image V1, respectively.

Accordingly, the control unit 170 may calculate a first homography that is a homography between the characteristic points D1, D2, D3, and D4 of the first virtual image V1 and the characteristic points E1, E2, E3, and E4 of the second virtual image V2. The first homography is the homography calculated on an assumption that the camera 110 is accurately mounted according to the design reference, and may be utilized for correcting the image as described above.

In the meantime, when the control unit 170 calculates the first homography, the control unit 170 may use only some of the reference values contained in the design reference information. Particularly, the design reference information may contain reference values for a height, at which a camera 110A needs to be spaced apart from the ground, a point in the vehicle, at which the camera 110A is to be mounted at the height, and a mounting posture, and the control unit 170 may calculate the first homography by using only some of the reference values. For example, an error generated in the mounting posture (for example, the direction) of the camera 110 may exert the largest influence on distortion of the image, so that the control unit 170 may calculate the first homography by using only the reference value for the mounting posture in the design reference information.

Figure 6:
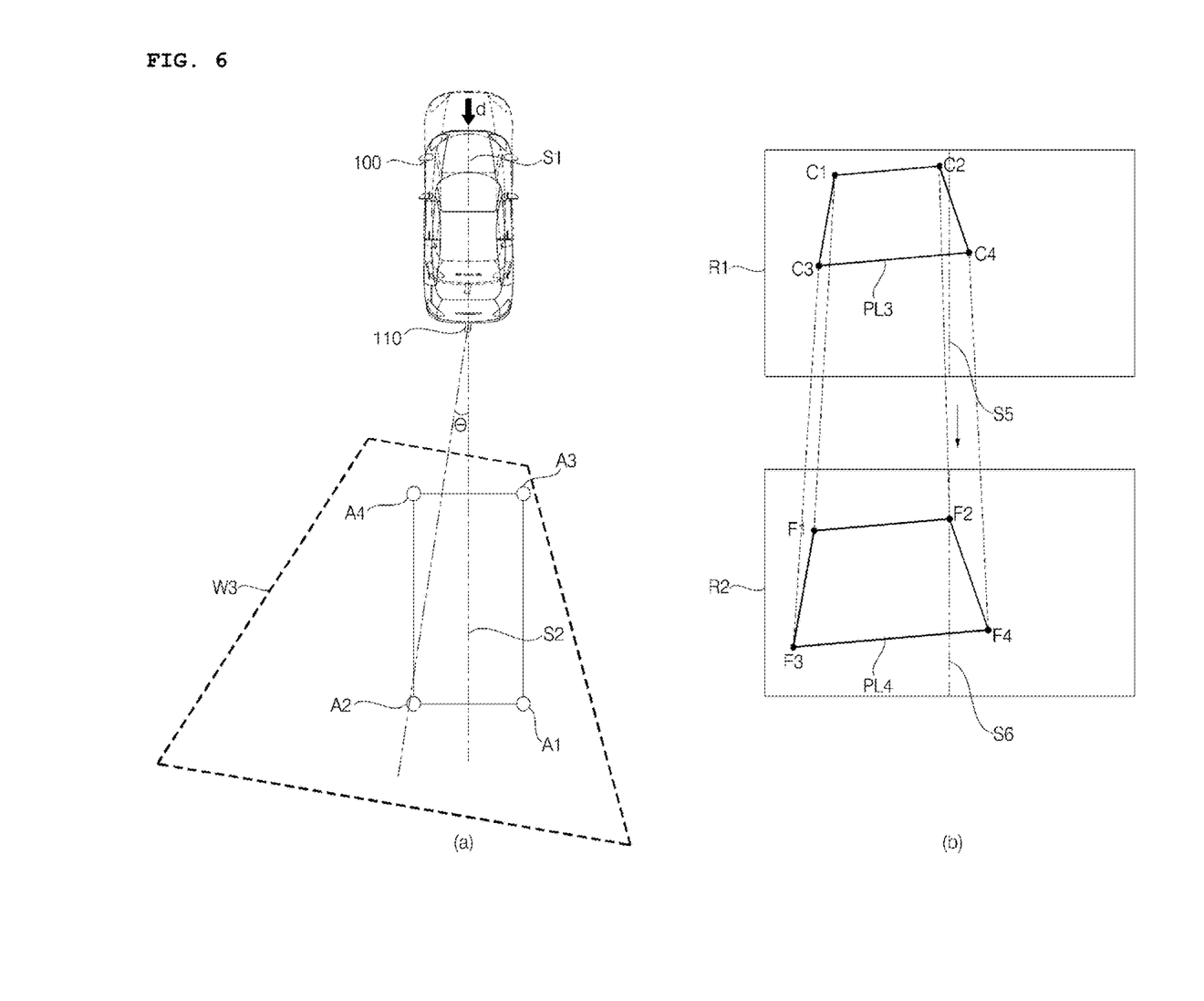
FIG. 6 is a diagram illustrating an example for describing an operation of calculating a second homography between two images photographed before and after travelling of a vehicle by the parking guide system according to the exemplary embodiment of the present invention.

FIG. 6 is a diagram illustrating an example for describing an operation of calculating a second homography between two images photographed before and after travelling of a vehicle by the parking guide system 100 according to the exemplary embodiment of the present invention. Here, it is assumed that points corresponding to the four apexes A1, A2, A3, and A4 of the parking line PL1 are extracted as the characteristic points of the image.

Referring to FIG. 6A, when the vehicle moves by a first distance d along the vertical axis S1 in the longitudinal direction of the vehicle in a state where the center axis of the camera 110 rotates by a first value θ to the right side from the center axis S1 in the longitudinal direction of the vehicle 100 as illustrated in FIG. 2A, the vehicle 100 approaches the parking line PL1 by the first distance d, and the camera 110 photographs a ground area W3.

Particularly, the control unit 170 extracts four characteristic points C1, C2, C3, and C4 from the first image R1 that is an image before the travelling as illustrated at an upper side of FIG. 6B, extracts four characteristic points F1, F2, F3, and F4 from the second image R2 that is an image after the travelling by the first distance d as illustrated at a lower side of FIG. 6B, and then matches the characteristic points of the first image R1 and the characteristic points of the second image R2, respectively. That is, the four characteristic points C1, C2, C3, and C4 illustrated in the first image R1 are sequentially matched to the four characteristic points F1, F2, F3, and F4 illustrated in the second image R2.

The control unit 170 may calculate a second homography that is a homography representing a conversion relation between the first image R1 and the second image R2 according to coordinates of the characteristic point of the first image R1 and the characteristic point of the second image R2.

Particularly, when the vehicle travels along the vertical axis S1 in the longitudinal direction in a state where the camera 110 is mounted according to the design reference (that is, the center axis of the camera 110 is matched with the center axis in the longitudinal direction of the vehicle), left and right positions of the characteristic points included in the first image R1 and the second image R2 should not be changed based on center vertical axes S5 and S6 of the plane of the image.

However, in FIG. 6B, the second characteristic point F2 of the second image R2 matched to the second characteristic point C2 positioned at the left side of the center vertical axis S5 of the first image R1 is positioned on the center vertical axis S6 of the plane of the image, which means that an error is generated in a mounting angle of the camera 110.

Hereinafter, in FIG. 7, an operation of correcting the second image illustrated at a lower side of FIG. 6B by applying the first homography to the second homography by the parking guide system 100 according to the exemplary embodiment of the present invention will be described.

Figure 7:
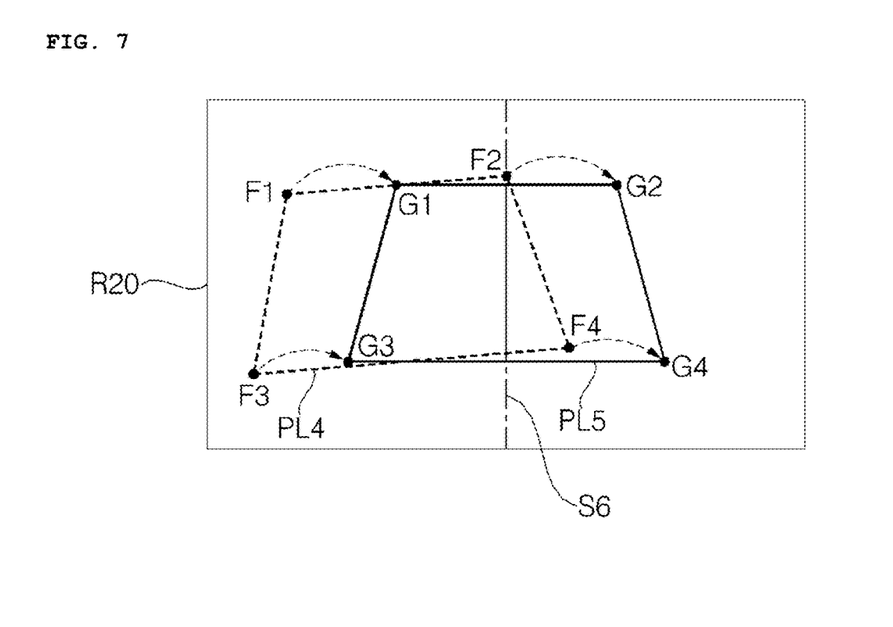
FIG. 7 is a diagram illustrating an example for describing an operation of correcting an image input through a camera by using a third homography that is a homography for correcting an image calculated by comparing the first homography and the second homography by the parking guide system according to the exemplary embodiment of the present invention.

FIG. 7 is a diagram illustrating an example for describing an operation of correcting an image input through the camera 110 by using a third homography that is a homography for correcting an image calculated by comparing the first homography and the second homography by the parking guide system 100 according to the exemplary embodiment of the present invention.

The control unit 170 may calculate a third homography that is a homography for correcting an image by substituting the first homography and the second homography to Equation 1. When the third homography is completely calculated, the control unit 170 may correct each image by applying the third homography to the second image R2 or the third image input through the camera 110 after the second image R2.

In order to help understanding, FIG. 7 illustrates a result image R20, in which the third homography is applied to the second image R2 illustrated at a lower end of FIG. 6B.

Referring to FIG. 7, when the third homography is applied to the second image R2 before the correction, the image is compensated in an opposite direction (that is, the left side) to the direction (that is, the right side) in which the camera 110 deviates, and thus a position of a parking line PL4 (indicated by a dotted line) displayed in a form deviating to the left side of the plane of the image in the second image R2 before the correction is changed to the right side of the plane R20 of the image by the application of the third homography as illustrated in FIG. 6B, so that the parking line PL4 before the correction after the travelling may be corrected to a new parking line PL5. That is, the four characteristic points F1, F2, F3, and F4 of FIG. 6B of the parking line PL4 (indicated by the dotted line) displayed on the second image R2 are coordinate-changed to positions of the four characteristic points G1, G2, G3, and G4 of the new parking line PL5.

In the meantime, FIG. 7 illustrates only the result R20 of the application of the third homography to the second image R2, but the control unit 170 may also correct the third image input after the second image R2 by using the third homography.

Figure 8:
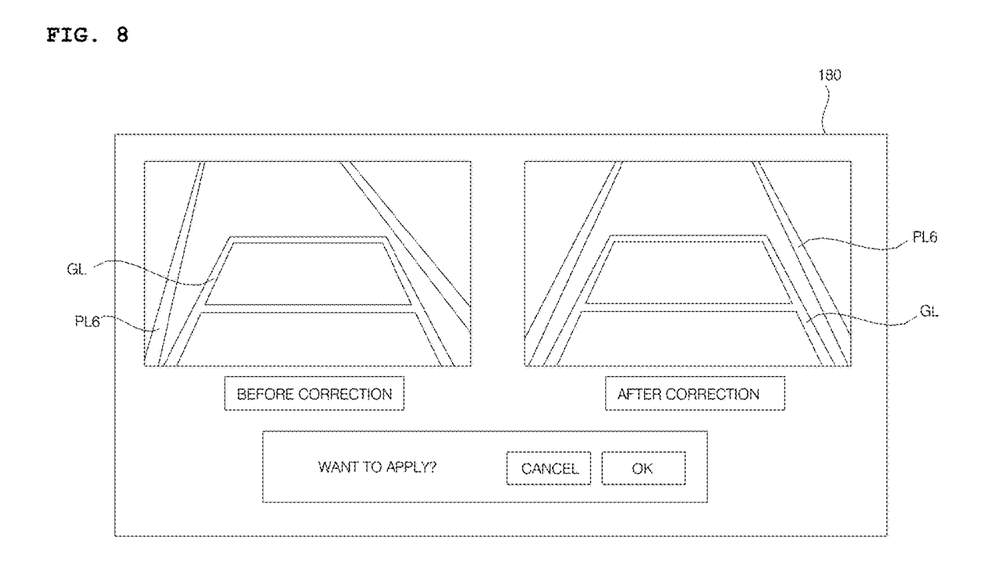
FIG. 8 is a diagram illustrating an example for describing an operation of displaying images before and after the correction on a display unit by the parking guide system according to the exemplary embodiment of the present invention.

FIG. 8 is a diagram illustrating an example for describing an operation of displaying images before and after the correction on the display unit by the parking guide system 100 according to the exemplary embodiment of the present invention. For convenience of the description, it is assumed in FIG. 8 that the center axis in the longitudinal direction of the vehicle is matched with the center axis in the longitudinal direction of the parking line, and the camera 100 deviates to the right side from the center axis in the longitudinal direction of the vehicle compared to the posture reference value in the design reference information.

Referring to FIG. 8, the control unit 170 may simultaneously output images before and after the application of the third homography by controlling the display unit 180. Reviewing the image before the correction, even though the center axis in the longitudinal direction of the vehicle is matched with the center axis in the longitudinal direction of the actual parking line, a parking line PL6 represented in the image is displayed as if deviating to the left side of the image. By contrast, reviewing the image after the correction, it can be seen that the parking line PL6 displayed while deviating to the left side of the image moves to the right side of the image according to the application of the third nomography. Accordingly, the user may confirm two images at a time, thereby being helpful in determining whether to approve the correction.

In this case, the control unit 180 may overlap a parking guide line GL on each image and display the image as illustrated in FIG. 8. Further, the control unit 180 may assign a visual effect, such as differently displaying a color of the parking guide line GL in stages according to a distance from the rear side of the vehicle. Further, the control unit 180 may also omit the display of the parking guide line GL according to a user input.

In the above, the operation of correcting the error generated when the posture of the camera 110 is horizontally changed (that is, fanned) compared to the design reference is mainly exemplified, but the present invention is not limited thereto. That is, it is to be appreciated that in a case where the posture of the camera 110 is vertically changed (that is, tilted) compared to the design reference, a case where the posture of the camera 110 is rotated in a clockwise direction or a counterclockwise direction based on the center axis of the camera 110 as a rotation axis, and a case where the mounting height or the mounting point of the camera 110 is changed from the design reference, an error of another value related to the extrinsic parameter of the camera 110 may be corrected by the same scheme.

In the above, the parking guide system 100 and the method for controlling the same of the present invention have been described with reference to the exemplary embodiments of the present invention, but those skilled in the art will understand that the present invention may be implemented in another specific form without changing the technical spirit or an essential feature thereof.

Thus, it is to be appreciated that embodiments described above are intended to be illustrative in every sense, and not restrictive. The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A parking guide system, comprising:
    a camera mounted on a vehicle and which photographs images of a rearward direction of the vehicle;
    a memory, in which camera parameter information and design reference information are stored;
    a travelling detecting sensor configured to measure travelling information containing a travelling distance and a travelling direction according to travelling when the vehicle travels;
    circuitry including a microprocessor and configured to:
        sequentially receive a first image that is an image before the travelling and a second image that is an image after the travelling from the camera;
        extract and match characteristic points commonly included in the first image and the second image;
        calculate a first homography, between a first virtual image having a randomly designated characteristic point therein and a second virtual image having the randomly designated characteristic point being virtually moved by a calculation based on the measured travelling information, based on the stored camera parameter information, the stored design reference information, and the measured travelling information;
        calculate a second homography, that is a homography between the first image having the extracted characteristic points therein and the second image having the extracted characteristic points therein, based on coordinates of the matched characteristic points; and
        calculate a third homography, that is a homography between the first homograpy and the second homograpy, for correcting an image photographed by the camera based on a result of a comparison of the first homography and the second homography; and
    a display device mounted on the vehicle and overlapping a parking guide line on the corrected image to which the third homography is applied.

2. The parking guide system of claim 1, further comprising:
    an obstacle detecting sensor configured to detect an obstacle existing within a predetermined distance from the vehicle,
    wherein the circuitry is configured to extract the characteristic points in an area, in which the obstacle is not detected by the obstacle detecting sensor, in the first image and the second image.

3. The parking guide system of claim 2, wherein the obstacle detecting sensor includes at least one of an ultrasonic sensor, a laser sensor, and an infrared sensor.

4. The parking guide system of claim 1, wherein the circuitry is configured to extract the characteristic points commonly included in the first image and the second image based on at least one of features from accelerated segment Test(FAST) algorithm, a scale invariant feature transform (SIFT) algorithm, a speeded up robust feature (SURF) algorithm, a Harris corner algorithm, a binary robust invariant scalable keypoints (BRISK) algorithm, an oriented fast and rotated brief (ORB) algorithm, and a fast retina keypoint (FREAK) algorithm.

5. The parking guide system of claim 1, wherein the circuitry is configured to extract four or more characteristic points commonly included in the first image and the second image.

6. The parking guide system of claim 1, wherein the third homography includes information about a change in a mounting posture of the camera, a change in a mounting height, or a change in a mounting position with respect to the design reference information.

7. The parking guide system of claim 1, wherein the camera parameter information includes information on an intrinsic parameter and an extrinsic parameter of the camera, and
    the design reference information includes a reference value for each of the mounting point, the mounting height, and the mounting posture of the camera.

8. The parking guide system of claim 1, wherein the circuitry is configured to stores the third homography in the memory.

9. The parking guide system of claim 1,
    wherein the circuitry is further configured to apply the third homography to a third image received after the second image from the camera.

10. The parking guide system of claim 9, wherein the display device displays a menu for receiving a selection about whether to apply the third homography to the third image received after the second image.

11. A method for controlling a parking guide system, comprising:
- photographing, by a camera mounted on a vehicle, images of a rearward direction of the vehicle;
- receiving, by circuitry including a microprocessor, a first image before travelling of the vehicle from the camera;
- determining, by the circuitry, whether an obstacle is detected at a rear side of the vehicle;
- measuring, by a travelling detecting sensor, a travelling distance and a travelling direction of the vehicle when it is determined that the obstacle is not detected;
- receiving, by the circuitry, a second image after the travelling of the vehicle from the camera;
- extracting and matching, by the circuitry, characteristic points commonly included in the first image and the second image;
- calculating, by the circuitry, a first homography, between a first virtual image having a randomly designated characteristic point therein and a second virtual image having the randomly designated characteristic point being virtually moved by a calculation based on the measured travelling information, based on camera parameter information and travelling information of the vehicle;
- calculating, by the circuitry, a second homography, that is a homography between the first image having the extracted characteristic points therein and the second image having the characteristic points therein, based on coordinates of the matched characteristic points;
- comparing, by the circuitry, the first homography and the second homography and determining whether an error exists between the first and second homographies;
- calculating, by the circuitry, a third homography, that is a homography between the first homography and the second homography, for correcting an image photographed by the camera, when the error exists between the first and second homographies, based on a result of a comparison of the first homography and the second homography; and
- displaying, by the circuitry, a parking guide line on the corrected image to which the third homography is applied by means of a display device mounted on the vehicle.

12. The method of claim 11, wherein the detecting of the obstacle is performed after the second image is received.

13. The method of claim 12, wherein when the obstacle is not detected after the second image is received, the extracting and matching of the characteristic points commonly included in the first image and the second image is performed.

* * * * *